(12) United States Patent
Reese et al.

(10) Patent No.: US 7,490,691 B2
(45) Date of Patent: Feb. 17, 2009

(54) ENGINE SUBFRAME MOUNTING ARRANGEMENT

(75) Inventors: Scott D Reese, New London, MN (US); Richard A Moen, Starbuck, MN (US); Bruce G Bastin, Starbuck, MN (US); Kevin C Lent, Glenwood, MN (US)

(73) Assignee: CNH America, LLC, Racine, WI (US)

( * ) Notice: Subject to any disclaimer, the term of this patent is extended or adjusted under 35 U.S.C. 154(b) by 0 days.

(21) Appl. No.: 11/463,320

(22) Filed: Aug. 9, 2006

(65) Prior Publication Data

US 2006/0289221 A1 Dec. 28, 2006

Related U.S. Application Data

(62) Division of application No. 10/880,823, filed on Jun. 30, 2004, now Pat. No. 7,108,098.

(51) Int. Cl.
*B60K 5/12* (2006.01)
*B60K 5/02* (2006.01)

(52) U.S. Cl. .................. 180/299; 180/291

(58) Field of Classification Search ............. 180/291, 180/299; 280/781–2, 228; 123/195
See application file for complete search history.

(56) References Cited

U.S. PATENT DOCUMENTS

| 1,473,651 | A |   | 11/1923 | Reuben |
| 1,698,453 | A |   | 1/1929 | Sardeson et al. |
| 2,296,181 | A |   | 9/1942 | Perkins |
| 2,633,203 | A | * | 3/1953 | Paton ........................ 180/12 |
| 2,837,348 | A | * | 6/1958 | Muller ....................... 280/788 |
| 2,935,149 | A |   | 5/1960 | Nallinger |
| 3,075,601 | A |   | 1/1963 | Muller |
| 3,841,426 | A |   | 10/1974 | Nemschoff |
| 3,913,696 | A |   | 10/1975 | Kennedy et al. |
| 4,258,820 | A |   | 3/1981 | Miura et al. |
| 4,723,791 | A |   | 2/1988 | Miura et al. |
| 4,753,315 | A |   | 6/1988 | Fujisaki et al. |
| 5,074,374 | A |   | 12/1991 | Ohtake et al. |
| 5,570,757 | A | * | 11/1996 | Courtwright et al. ........ 180/291 |
| 5,573,222 | A |   | 11/1996 | Ruehl et al. |
| 6,085,858 | A |   | 7/2000 | Wakana et al. |
| 6,679,523 | B2 |  | 1/2004 | Yamamoto et al. |
| 6,708,793 | B2 |  | 3/2004 | Witherspoon et al. |
| 6,843,524 | B2 |  | 1/2005 | Kitagawa |
| 6,959,780 | B2 |  | 11/2005 | Oshima et al. |

* cited by examiner

*Primary Examiner*—Christopher P Ellis
*Assistant Examiner*—Vaughn T Coolman
(74) *Attorney, Agent, or Firm*—Rebecca Henkel

(57) ABSTRACT

A subframe arrangement is configured for a mobile vehicle chassis assembly to enhance isolation of the subframe platform and drive mechanism from flex in the chassis assembly caused by dynamic forces associated with operation of the chassis assembly. The chassis assembly includes a frame having a front and a rear frame support, and a pair of elongated frame side supports interconnected therebetween. The subframe arrangement includes a subframe platform configured to receive the drive-unit, and a plurality of subframe mounting couplings operable to attach the subframe platform to the pair of elongated frame side supports. Each of the plurality of subframe mounting couplings is located along a generally isosceles triangular-shaped arrangement that enhances isolation of the subframe arrangement and attached drive unit.

3 Claims, 4 Drawing Sheets

ENGINE SUBFRAME MOUNTING ARRANGEMENT

CROSS REFERENCE TO RELATED APPLICATIONS

This patent application is a Divisional of co-pending U.S. patent application Ser. No. 10/880,823, filed on Jun. 30, 2004 entitled, "Engine Subframe Mounting Arrangement" and having Scott D. Reese et al. as the Applicant.

FIELD OF THE INVENTION

The invention relates to a vehicular chassis assembly and, more particularly, relates to a vehicular chassis assembly in combination with a subframe mounting arrangement configured to isolate a mounted drive unit from deflection and distortion associated with operation of the chassis assembly.

DISCUSSION OF THE RELATED ART

Large mobile vehicles generally employ a drive mechanism or unit configured to drive a chassis assembly. The vehicular chassis assembly typically includes a front axle and a rear axle driven by the drive mechanism, and a cradle or subframe assembly configured to receive the drive mechanism. Specifically, in regard to operation of large vehicles (e.g., agricultural applicators, etc.) over rough terrain, extreme torque forces are transferred from the front and rear axles to the chassis assembly. The chassis assembly transfers these torque forces to the subframe assembly, leading to wear and tear to the drive subframe assembly and drive mechanism. In particular, these torque forces are known to crack welds attaching the subframe assembly with the chassis assembly.

Known subframe assemblies for mobile vehicle chassis assemblies have several drawbacks. U.S. Pat. No. 3,075,601 to Muller discloses an auxiliary frame suspended from a fork-type frame. A driving unit is located between the auxiliary frame and the fork-type frame. The auxiliary frame is suspended by three rubber buffers mounted toward a forward portion of the fork-type frame. A drawback of the Muller auxiliary frame is that the auxiliary frame employs an elongated support structure that allows the auxiliary frame to twist rather than float as a level, rigid subframe.

U.S. Pat. No. 4,258,820 to Miura et al. discloses a subframe supporting device to support an engine. The subframe supporting device includes an upper holding plate opposed to a lower holding plate, and a spacer pipe connected therebetween. A drawback is that the Miura et al. subframe employs elastic support members that again allow the subframe to flex and twist rather than float as a level, rigid subframe.

Accordingly, there is a need for a subframe assembly or arrangement configured to isolate the torque forces and associated flex experienced by the chassis assembly, and which is subsequently transferred to the subframe assembly and drive mechanism.

SUMMARY OF THE INVENTION

The present invention provides a subframe arrangement for attachment to a chassis assembly of a mobile vehicle.

In a first embodiment of the present invention, a subframe arrangement for a mobile vehicle chassis assembly is configured to enhance isolation of the chassis assembly from the drive mechanism. The chassis assembly includes a front axle and a rear axle and a pair of elongated side supports interconnected therebetween. The first and second elongated frame side supports are each located on either side of a longitudinal axis of the chassis assembly.

The preferred subframe arrangement includes a subframe platform configured to receive the engine, and a plurality of subframe mounting couplings operable to attach the subframe platform to the chassis assembly. The plurality of subframe mounting couplings includes a first and second subframe coupling. The first subframe mounting coupling is coupled to the first frame side support, and the second mounting coupling is coupled to the second frame side support. The plurality of subframe mounting couplings are located or positioned in a triangular-shaped arrangement. A preferred subframe arrangement includes the subframe mounting couplings disposed generally equidistant from, and on either side of, the longitudinal axis of the chassis assembly in a generally "isosceles" triangular-shaped arrangement.

In another embodiment, the present invention provides an agricultural applicator in accordance with the present invention. The agricultural applicator includes a chassis assembly having a frame that includes a front frame support, a rear frame support, and a first and a second frame side support coupled therebetween. The first frame side support is located on one side of a longitudinal defined by the chassis assembly, and the second frame side support is located on the other side of the longitudinal axis. A subframe arrangement is coupled to the chassis assembly. The subframe arrangement includes a subframe platform configured to receive the drive unit, and a plurality of subframe mounting couplings operable to attach the subframe platform to the chassis assembly. The plurality of subframe mounting couplings include a first subframe mounting coupling attached to the first frame side support, and a second subframe mounting coupling attached to the second frame side support. The plurality of subframe mounting couplings are located in a triangular-shaped arrangement.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

A wide variety of vehicles could be constructed in accordance with the invention defined by the claims. Hence, while preferred embodiments of the invention will now be generally described with reference to a subframe arrangement in support of a drive unit associated with movement of a chassis assembly of a mobile vehicle in a direction of travel. The type of drive unit (e.g., hydraulic, pneumatic, mechanical, electrical, etc.) and combinations thereof can vary.

Figure 1:
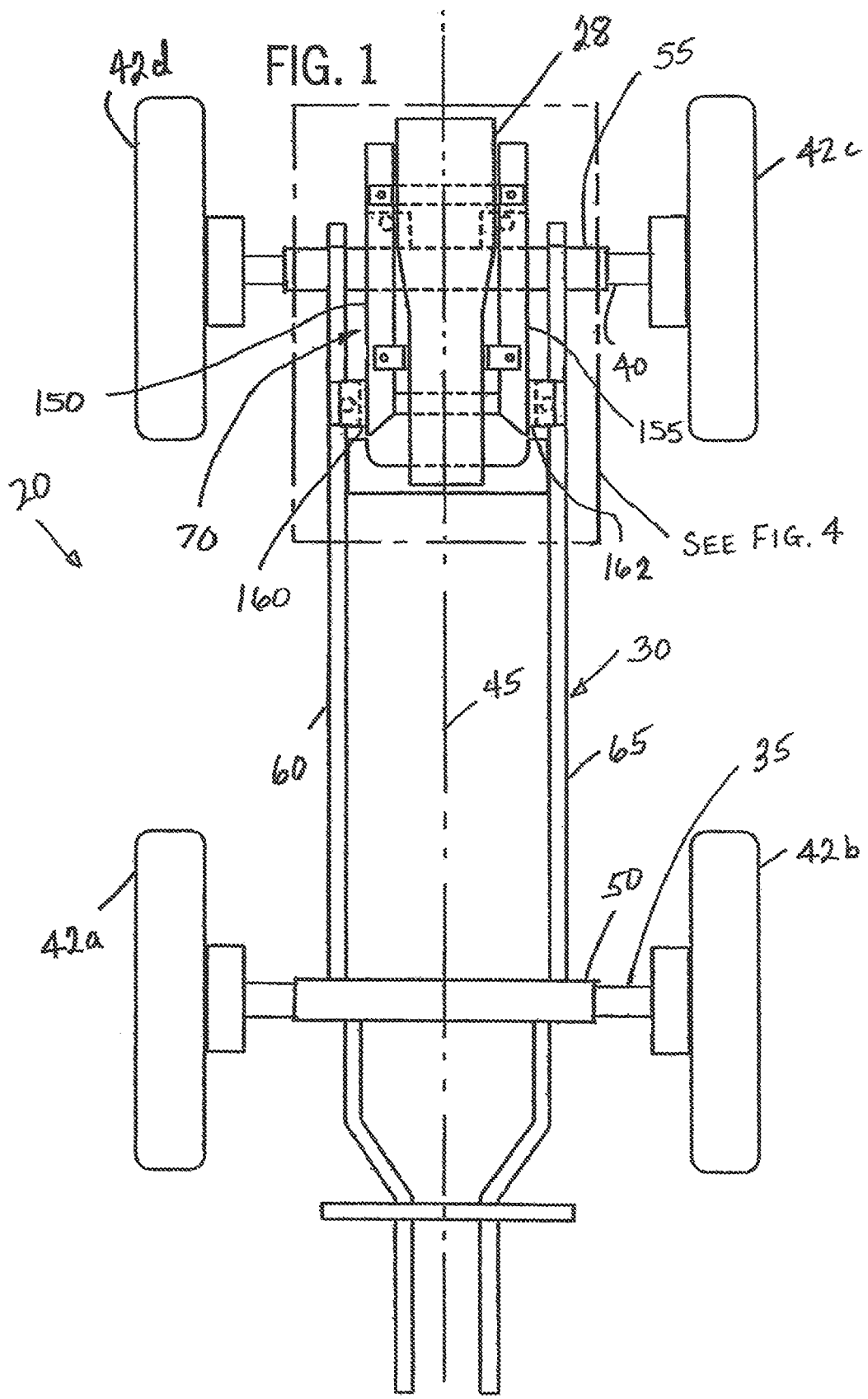
FIG. 1 illustrates a plan view of a mobile vehicle chassis assembly having one embodiment of a subframe arrangement in accordance with the present invention.

FIG. 1 illustrates a mobile chassis assembly 20 having a preferred embodiment of a subframe arrangement 25 in accordance with the present invention. The subframe arrangement 25 is in support of a drive unit 28 of the mobile chassis assembly 20. A preferred embodiment of the mobile chassis assembly 20 as shown employs a frame 30 in support of a front axle 35, a rear axle 40, and associated wheel assemblies 42a-d. A longitudinal axis 45 generally extends in the direction of travel of the chassis assembly 20. The frame 30 includes a front frame support 50, a rear frame support 55, and a pair of frame side supports 60 and 65 interconnected therebetween. The front and rear frame supports 50 and 55 are configured to receive the front and rear axles and their associated wheel assemblies 42a-d. The pair of frame side supports 60 and 65 are disposed on opposite sides of the longitudinal axis 45. The type (e.g., hollow beams, etc.) and composition of the frame 30 can vary. Although a preferred embodiment of the mobile chassis assembly 20 as shown employs first and second frame side supports 60 and 65 extending generally parallel to the longitudinal axis 45, and front and rear frame supports 50 and 55 extending generally transverse therebetween, the general alignment (e.g., linear, curvilinear, etc.) of the front and rear frame supports 50 and 55 and the first and second frame side supports 60 and 65 can vary.

Figure 2:
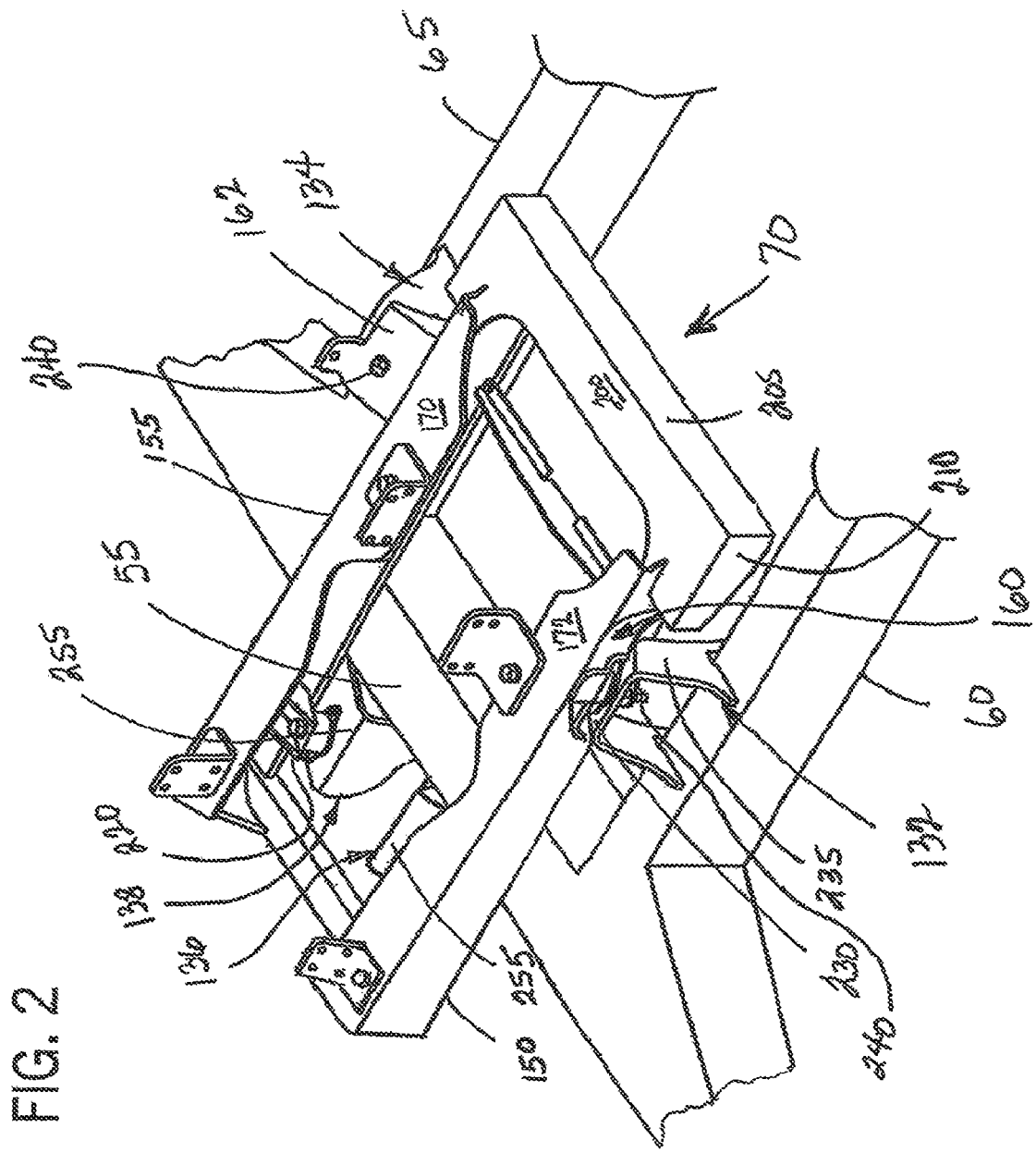
FIG. 2 illustrates a perspective view of the subframe arrangement shown in FIG. 2.
Figure 3:
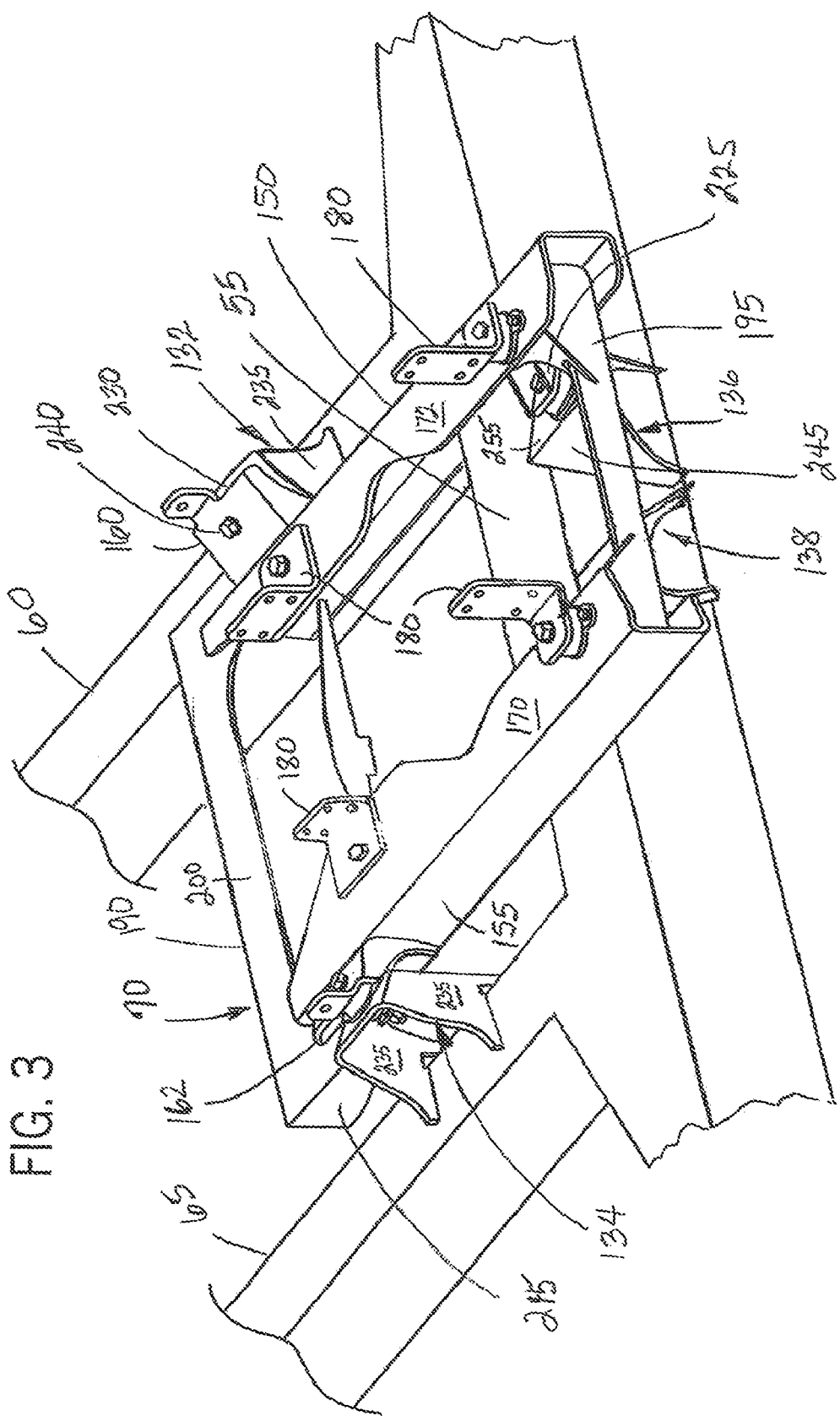
FIG. 3 illustrates another perspective view of the subframe arrangement shown in FIG. 2.
Figure 4:
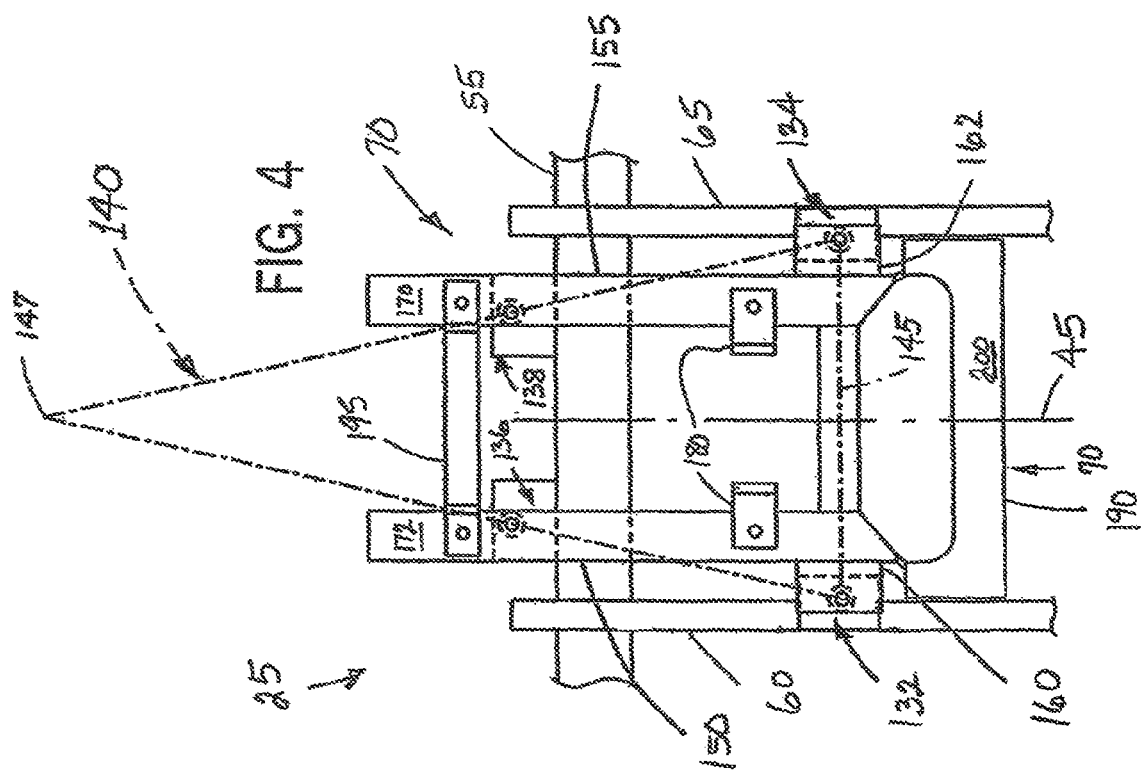
FIG. 4 illustrates a detailed plan view of the subframe arrangement shown in FIG. 2.

Still referring to FIGS. 1-4, the preferred subframe arrangement 25 includes a subframe platform 70 and a series of subframe mounting couplings, such as subframe mounting couplings 132, 134, 136, and 138, that in combination are configured to isolate the subframe arrangement 25 from forces attributable to flex movement in the chassis assembly 20. Flex movement includes deflection and/or twisting in the structural elements that general define the chassis assembly 20. The deflection and/or twisting are generally caused by dynamic forces associated with operation of the chassis assembly 20. The subframe arrangement 25 of the invention isolates the drive unit 28 from flex in the chassis assembly 20 when traversing uneven terrain where conditions are such that independent wheel suspension parts approach their limits of displacement. The subframe arrangement 25 not only isolates the drive unit 28, but can also isolate other mounted elements (e.g., cooling package, hydrostatic drive pumps, etc.) from these undesirable deflections and flex displacements. Referring to FIG. 4, the subframe arrangement 25 of the invention employs mounting couplings disposed in a generally triangular arrangement. The preferred mounting coupling employs elastomeric material (e.g. rubber and/or springs) operable to isolate the subframe arrangement from flex in the chassis assembly 20. Yet, other types of mounting couplings known in the art could also be employed.

FIGS. 2-4 illustrates the preferred subframe arrangement 25. The subframe arrangement 25 includes the subframe platform 70 coupled to the chassis assembly 20 by the series of subframe mounting couplings 132, 134, 136, and 138, located or positioned in a generally isosceles triangular-shaped arrangement as illustrated by reference line 140. The series of subframe mounting couplings 132, 134, 136, and 138 are generally located on either side of, and generally equidistant from, the longitudinal axis 45 of the chassis assembly 20. The series of subframe mounting couplings 132, 134, 136, and 138 include a first pair of subframe mounting couplings 132 and 134 and a second pair of subframe mounting couplings 136 and 138. The first pair of subframe mounting couplings 132 and 134 are coupled to the elongated frame side supports 60 and 65 on either side of the longitudinal axis 45 defined by the chassis assembly 20. The configuration or arrangement of the first pair of subframe mounting couplings 132 and 134 defines a base 145 opposite a vertex 147 of the isosceles triangular-shaped arrangement 140. The second pair of subframe mounting couplings 136 and 138 are also disposed equidistant from, and on either side of, the longitudinal axis 45 of the chassis assembly 20. The second pair of subframe mounting couplings 136 and 138 are disposed rearward toward the vertex 147 of the isosceles triangular-shaped arrangement 140 relative to the first pair of subframe mounting couplings 132 and 134 at the base 145 of the isosceles triangular arrangement 140. The subframe arrangement 25 of the plurality of subframe mounting couplings 132, 134, 136, and 138 allow level pivoting of the rigid subframe platform 70 about the longitudinal axis 45 when the frame 30 or chassis 20 flexes under dynamic forces associated with operation of the chassis assembly 20. Thereby, the subframe arrangement 25 provides the desirable effect of level pivoting of the subframe platform 70 and attached drive unit 28 about the longitudinal axis 45 in response to a deflection or flex of the chassis assembly 20.

A preferred embodiment of the subframe platform 70 includes a first platform side support 150 and a second platform side support 155 disposed on either side of the longitudinal axis 45 defined by the chassis assembly 20 and in generally parallel alignment with the frame side supports 60 and 65 of the chassis assembly 20. Each platform side support 150 and 155 is coupled to an integral side mount 160 and 162, respectively, extending generally outward and upward from the platform side supports 150 and 155 of the subframe arrangement 25. Each platform side support 150 and 155 includes an upper portion 170 and 172, respectively, having openings configured to receive a series of drive unit mounting assemblies 180 coupling the drive unit 28 to the platform 70. The drive unit mounting assemblies 180 further enhance isolation of the drive unit 28 from flex in the chassis assembly 20. The subframe platform 70 further includes a platform front support 190 opposite a platform rear support 195. The platform front support 190 is interconnected between the first and second platform side supports 150 and 155 of the subframe arrangement 25. The platform front support 190 includes an upper portion 200 disposed lower relative to the upper portion 170 of the platform side supports 150 and 155. The platform front support 190 further includes a side portion 205 and a pair of edge portions 210 and 215 disposed at opposite ends thereof. The platform rear support 195 is disposed opposite the platform front support 190 of the subframe platform 70. A second pair of side mounts 220 and 225 extend inward toward, and are located generally equidistant relative to, the longitudinal axis 45 in general alignment with the isosceles triangular-shaped arrangement 140. The second pair of side mounts 220 and 225 also extend generally upward relative to horizontal toward the upper portion 170 and 172 of platform side supports 150 and 155, respectively, of the platform 70.

A preferred embodiment of the first pair of subframe mounting couplings 132 and 134 each include an upper portion 230 extending generally upward in general alignment to couple to the first pair of side mounts 160 and 162 of the subframe arrangement 25. The first pair of subframe mounting couplings 132 and 134 each further include a pair of sidewalls 235 extending downward from the upper portion 230 in a generally vertical direction to engage the frame side supports 60 and 65 of the chassis assembly 20. A fastener 240 couples each of the subframe mounting couplings 132 and 134 to the side mounts 160 and 162. A preferred fastener 240 is a combination of a bolt fastener and washer, but the type of fasteners used can vary. A preferred embodiment of the second pair of subframe mounting couplings 136 and 138 each includes a pair of sidewalls 245 and an upper portion 255 extending therebetween. The upper portion 255 of the subframe mounting couplings 136 and 138 are disposed at an angle relative to horizontal in general alignment with the side mounts 220 and 225 of the subframe arrangement 25. Each pair of side mounts 220 and 225 is coupled inward toward the longitudinal axis 45 relative to the platform side supports 150 and 155, respectively.

Figure 5:
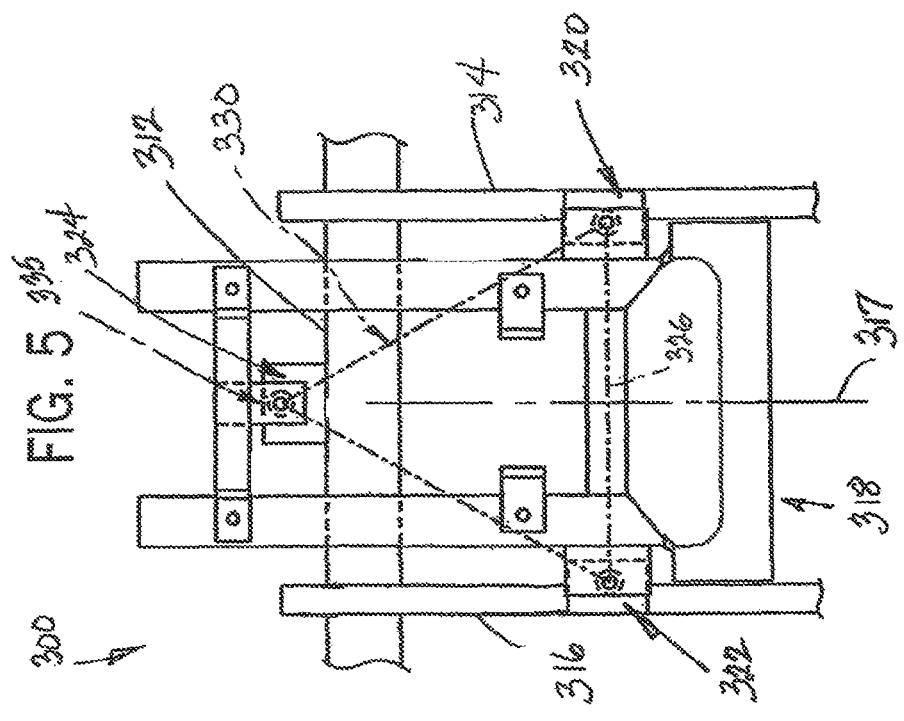
FIG. 5 illustrates a detailed plan view of a mobile vehicle chassis assembly having another embodiment of a subframe arrangement in accordance with the present invention.

FIG. 5 illustrates another embodiment of a subframe arrangement 300 in accordance with the present invention configured with a chassis assembly having a frame that includes a front frame support (not shown), a rear frame support 312, and a pair of frame side supports 314, 316 connected therebetween relative to a longitudinal axis 317, similar to the chassis assembly 20 and frame 30 described above. The subframe arrangement 300 employs a subframe platform 318 similar to the subframe platform 70 described above, and three subframe mounting couplings 320, 322, and 324, each generally identical to the subframe mounting couplings 132, 134, 136, and 138 described above. Two of the subframe mounting couplings 320 and 322 are located along a base 326 of an isosceles triangular-shaped arrangement illustrated by reference line 330 similar to the isosceles triangular-shaped arrangement illustrated by reference line 140 described above. Subframe mounting couplings 320 and 322 are attached to the side supports 314 and 316, respectively, of the chassis assembly. The third subframe mounting coupling 324 is located or positioned at a vertex 335 of the isosceles triangular-shape reference line 330 opposite the base 326, and coupled to the rear frame support 312 of the chassis assembly. The location of the third subframe mounting coupling 324 relative to the opposite two subframe mounting couplings 320 and 322 at the base 326 of the triangular-shaped reference line 330 in accordance with the subframe arrangement 300 allows the subframe platform 318 to pivot as a level and rigid structure, thereby isolating the drive unit 28 from deflections and/or twists in the chassis assembly caused by dynamic forces associated with operation of the chassis assembly.

Referring to FIG. 1, although the chassis assembly 20 is shown for an agricultural applicator having the subframe arrangement 25 and drive unit 28 located at its rearward end relative to the direction of travel, it is understood that the subframe arrangement and drive unit 28 can be located anywhere along the chassis assembly 20. Although not shown, the chassis assembly 20 can further include other structural elements configured to other known components (e.g. storage tanks, housings, etc.) associated with agricultural applicators. Furthermore, although an "isosceles" triangular arrangement is shown, it is understood that the triangular arrangement can be an equilateral triangular-shaped arrangement. Still furthermore, it is understood that the number of subframe mounting couplings in the triangular subframe arrangement can be odd or even numbered and are not limited in total number.

Many changes and modifications could be made to the invention without departing from the spirit thereof. The scope of these changes will become apparent from the appended claims.

We claim:

1. An agricultural applicator, comprising:
a chassis assembly having a frame that includes a front frame support, a rear frame support, and a first and second frame side support coupled therebetween, the first frame side support located on one side of a longitudinal axis defined by the chassis assembly, the second frame side support located on the other side of the longitudinal axis;
a drive unit to drive movement of the chassis assembly in a direction of travel; and
a subframe arrangement coupled to the chassis assembly, the subframe arrangement configured to support the drive unit of the chassis assembly, the subframe arrangement comprising:
a subframe platform configured to receive the drive-unit, the subframe platform including a first platform side support and a second platform side support each extending generally parallel to the longitudinal axis defined by the chassis assembly, the first platform side support located on one side of the longitudinal axis, the second platform side support located on the other side of the longitudinal axis; and
a plurality of subframe mounting couplings operable to support the first and second platform side supports above the frame of the chassis assembly, the plurality of subframe mounting couplings comprising a first subframe coupling attached to the first platform side and a second subframe coupling attached to the second platform side support, wherein the plurality of mounting couplings are positioned in a triangular-shaped arrangement,
wherein:
the triangular-shaped arrangement is a generally isosceles triangular-shaped arrangement and, wherein the first and second subframe mounting couplings each are disposed equidistant from the longitudinal axis; and the subframe arrangement allows for pivoting of the subframe platform and the drive unit supported thereon in response to deflection of the chassis assembly
wherein each of the plurality of subframe mounting couplings includes a pair of sidewalls extending downward from an upper portion extending therebetween, the sidewalls engaged against one of the respective first and second frame side supports, and wherein the upper portion is disposed at an angle relative to horizontal.

2. The agricultural applicator as recited in claim 1, wherein the plurality of subframe mounting couplings further comprises a third and fourth subframe mounting coupling, the third and fourth subframe mounting couplings each disposed generally equidistant from, and on either side of, the longitudinal axis defined by the chassis assembly, wherein the first and second platform side supports of the platform includes a first and second side mount each extending outward from the first and second platform side supports, respectively, relative to the longitudinal axis of the chassis assembly, the first and second side mounts configured to receive the first and second subframe mounting couplings, respectively, wherein the first and second subframe mounting couplings each includes a mounting bracket having an upper portion extending upward and outward relative to the first and second platform side supports of the platform, the upper portion of the mounting bracket of the first and second of each subframe mounting couplings in general alignment to couple to the first and second integral side mounts, respectively, of the subframe platform.

3. The agricultural applicator as recited in claim 1, wherein the plurality of subframe mounting couplings includes a third subframe mounting coupling located at a vertex of the generally triangular-shaped arrangement.

* * * * *